(12) United States Patent
Kunsman

(10) Patent No.: US 6,412,824 B2
(45) Date of Patent: *Jul. 2, 2002

(54) PIPE BRANCH FITTING

(75) Inventor: Donald R. Kunsman, Bethlehem, PA (US)

(73) Assignee: Victaulic Company of America, Easton, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/235,990

(22) Filed: Jan. 22, 1999

(51) Int. Cl.$^7$ ................................................. F16L 41/00
(52) U.S. Cl. ........................ 285/197; 285/198; 277/626
(58) Field of Search ................................ 285/197–198, 285/199, 106; 277/608, 612, 615, 626, 644

(56) References Cited

U.S. PATENT DOCUMENTS

| | | | | |
|---|---|---|---|---|
| 1,278,128 A | * | 9/1918 | Flower | 285/197 |
| 2,266,383 A | * | 12/1941 | Quintrell | 285/106 |
| 2,352,192 A | * | 6/1944 | Gasche | 285/106 |
| 2,826,435 A | | 3/1958 | Schustack | 285/110 |
| 2,922,664 A | * | 1/1960 | Risley et al. | 285/106 |
| 3,471,176 A | | 10/1969 | Gilchrist | 285/111 |
| 3,489,441 A | | 1/1970 | Malcolm | 285/197 |
| 3,622,184 A | | 11/1971 | Deasy et al. | 285/197 |
| 3,807,435 A | | 4/1974 | Fenster et al. | 137/317 |
| 3,870,064 A | * | 3/1975 | Vigneron | 285/197 |
| 3,944,263 A | * | 3/1976 | Arnold | 285/106 |
| 3,999,785 A | | 12/1976 | Blakeley | 285/111 |
| 4,073,513 A | | 2/1978 | Blakeley | 285/93 |
| 4,157,195 A | | 6/1979 | Costanzo et al. | 285/4 |
| 4,158,461 A | | 6/1979 | Francis | 285/197 |
| 4,506,917 A | | 3/1985 | Arne | 285/4 |
| 5,149,144 A | | 9/1992 | Blakeley | 285/23 |
| 5,697,650 A | * | 12/1997 | Brown | 285/197 |

FOREIGN PATENT DOCUMENTS

| | | | | |
|---|---|---|---|---|
| FR | 2610695 | * | 8/1988 | 285/197 |
| NL | 246097 | * | 2/1964 | 285/197 |

* cited by examiner

Primary Examiner—Teri Pham Luu
(74) Attorney, Agent, or Firm—Abelman, Frayne & Schwab

(57) ABSTRACT

A mechanical coupling is provided for connecting a branch pipe to a main pipe at a hole through the main pipe. The coupling includes an elastomeric sealing gasket which has a plurality of generally parallel extending, but radially spaced, circumferential seals to effect a secure sealing engagement between the main pipe and the branch pipe in a minimal size coupling. Further, there is increased retention of the gasket within the coupling during on-site assembly which facilitates such assembly.

16 Claims, 3 Drawing Sheets

PIPE BRANCH FITTING

FIELD OF THE INVENTION

The invention relates to the interconnection of pipes, and more particularly to a mechanical coupling for connecting a branch pipe to a main pipe which includes an improved multi-surface sealing gasket therebetween.

BACKGROUND OF THE INVENTION

It is known to connect branch pipes to a main pipe via an opening in the main pipe, with a saddle type clamp providing an effectively sealed, and mechanically secure connection therebetween. Typical of such couplings are the style 920 and 921 outlet couplings available from Victaulic Company of America, Easton, Pa., the Assignee of the present invention, and Blakeley U.S. Pat. No. 3,999,785, whose teachings are incorporated by reference herein. As shown in Blakeley U.S. Pat. No. 3,999,785, the mechanical coupling for connecting the branch pipe through a hole in the main pipe is comprised of two opposed arcuate sections which define a cylindrical space therebetween for embracing the wall of the main pipe about the hole. One of the arcuate sections, which is intended to also receive the branch pipe, includes a concave saddle wall opening which defines a portion of a cylindrical surface having a radius generally corresponding to the outer circumference of the main pipe. The branch pipe connecting portion of the arcuate section includes a radially extending branch pipe opening which is dimensioned to overlie the main pipe opening and communicate with the saddle wall. A spigot wall surrounds the branch pipe opening, terminating at the saddle wall about the perimeter of the main pipe opening. A pressure sensitive elastomeric gasket is placed about the connection between the coupling member and the opening within the main pipe in order to provide an effective seal therebetween. The gasket is typically placed within a gasket recess of the coupling member, about the spigot wall. The gasket includes sealing surfaces which are applied against the cylindrical surface of the main pipe, spigot wall, and gasket recess. It has been determined that a sufficiently large area of the main pipe proximate the hole being connected to the branch pipe must be engaged by the gasket in order to provide an effective seal. This seal area must be of a size sufficient to compensate for possible irregularities in the pipe surface which could be caused by such factors as welds during manufacture, damage during shipment, or manufacturing tolerances. The gasket construction shown in aforementioned U.S. Pat. No. 3,999,785, as well as that utilized in the Victaulic 920 and 921 outlet couplings has provided a safe and effective seal. However the configuration of the seal has necessitated a significant increase in the overall size of the coupling to accommodate the greater sealing surface areas required with the coupling of larger pipe sizes. Accordingly, it would be desirable to reconfigure the coupling, and particularly the gasket construction and its associated sealing surfaces, such that larger pipe sizes can be connected without necessitating a significant increase in the size of the coupling.

SUMMARY OF THE INVENTION

The present invention provides an improved gasket construction, and associated sealing surfaces, which results in an extremely reliable and effective seal within the coupling between branch pipe and main pipe in a manner which maximizes the circumferential sealing surface against the main pipe without necessitating the heretofore requirement of substantially increasing the size of the coupling. Furthermore, it has been determined that the gasket construction of the present invention modifies its associated gasket recess within the saddle of the coupling member in a manner which advantageously simplifies the manufacture of the coupling, as well as the on site assembly of the gasket within the coupling.

The gasket of the present invention utilizes a novel plurality of sealing surfaces between the gasket recess within the pipe coupling member and proximate surface of the main pipe about the branch coupling hole in a manner which maximizes the effective sealing areas, while minimizing the gasket radius and depth. More specifically, the elastomeric gasket, which is of a generally saddle shape corresponding to the outer circumference of the main pipe includes three generally parallel extending, but radially spaced, circumferential seals. The first circumferential sealing surface is at the radially inward extent of the gasket, and is in contact with the outer circumferential surface of the main pipe proximate the branch pipe spigot. It provides a continuation of the coupling saddle wall. The second generally circumferential sealing surface is provided at the radially opposed outward end terminus of the gasket which is in engagement with the outward wall terminus of the gasket recess. A third generally circumferential sealing surface is radially intermediate with the first and second generally circumferential sealing surfaces and is in engagement with the coupling saddle wall. A generally radial step is provided between the second and third sealing surfaces to provide a fourth generally radial sealing surface which is in engagement with a generally radial sealing surface of the gasket recess opposite the spigot wall. By virtue of this construction, the circumferential sealing area of the first sealing surface, which is in engagement with the main pipe outer circumference, will generally correspond to the sum of the circumferential areas of the second and third sealing surfaces. This configuration permits a maximizing of the first circumferential sealing area with a minimal increase in both the diameter and depth of the sealing gasket.

Since the sealing gasket must tightly fit within the coupling gasket recess which surrounds the branch pipe spigot wall, the present invention minimizes the size of the coupling to obtain the requisite sealing area against the main pipe, as well as the depth of the gasket groove.

Additional advantages are achieved by minimizing the depth of the gasket groove. Specifically, since the coupling is typically formed of a malleable iron casting, reducing the depth of the gasket recess permits a reduction of mold draft along these coupling walls. This facilitates the removal of the casting from the mold.

As a further advantage, when the coupling is installed, the on site worker typically lubricates the gasket before placing the gasket within the gasket recess. The shape, dimensions, and mating configuration of the gasket and gasket recess in accordance with the present invention will experience less propensity of the gasket to fall out of the gasket recess during its on site installation within the coupling. Hence, in addition to providing a more compact coupling and efficient gasket seal, the present invention enhances both the manufacture of the coupling and its on site installation.

In accordance with a further feature of a preferred embodiment of the present invention, the gasket includes a radially extending annular pressure slot without its second sealing surface, (which is in engagement with the radially outward wall terminus of the gasket recess), to bifurcate this surface and provide first and second pressure responsive moveable radial wall surfaces. The first of the radial wall surfaces opposes the spigot wall. The other radial wall surface forms the opposed radial wall of the fourth sealing surface (established by the radial step within the gasket). A transmission means, which may preferably be in the form of a plurality of radial channels, extends between the first and second sealing surfaces for transmitting the pressure within the main pipe to the annular pressure slot. Thus, the pressure transmitted to the annular slot urges these first and second radial wall surfaces in sealing engagement with the opposed wall surfaces of the spigot wall and gasket groove to further optimize the effectiveness of the seal provided by the gasket construction of the present invention.

Accordingly, it is a primary object of the present invention to provide an improved multi-surface gasket seal for utilization in a coupling between a main pipe and branch pipe.

A further object is to provide such a gasket seal which permits an increase in the circumferential sealing area against the main pipe while minimizing the coupling size.

Another object of the present invention is to provide an effectively sealed mechanical coupling between a main and branch pipe, which is of compact size.

An additional object of the present invention is to provide an elastomeric sealing gasket which is of a generally saddle shape and includes three generally parallel extending, but radially spaced, circumferential seals.

Yet a further object of the present invention is to provide such an elastomeric gasket in which two of the circumferential seals are at the opposed ends of the gasket, and a third seal is radially intermediate the aforesaid seals, and is established by a radial step therebetween.

Yet another object of the present invention is to provide such a gasket for utilization in a main pipe to branch pipe coupling, which further includes an annular pressure slot to enhance the sealing forces.

These as well as other objects of the present invention will become apparent upon a consideration of the following detailed description and drawings.

BRIEF DESCRIPTION OF THE PREFERRED EMBODIMENT

Figure 1:
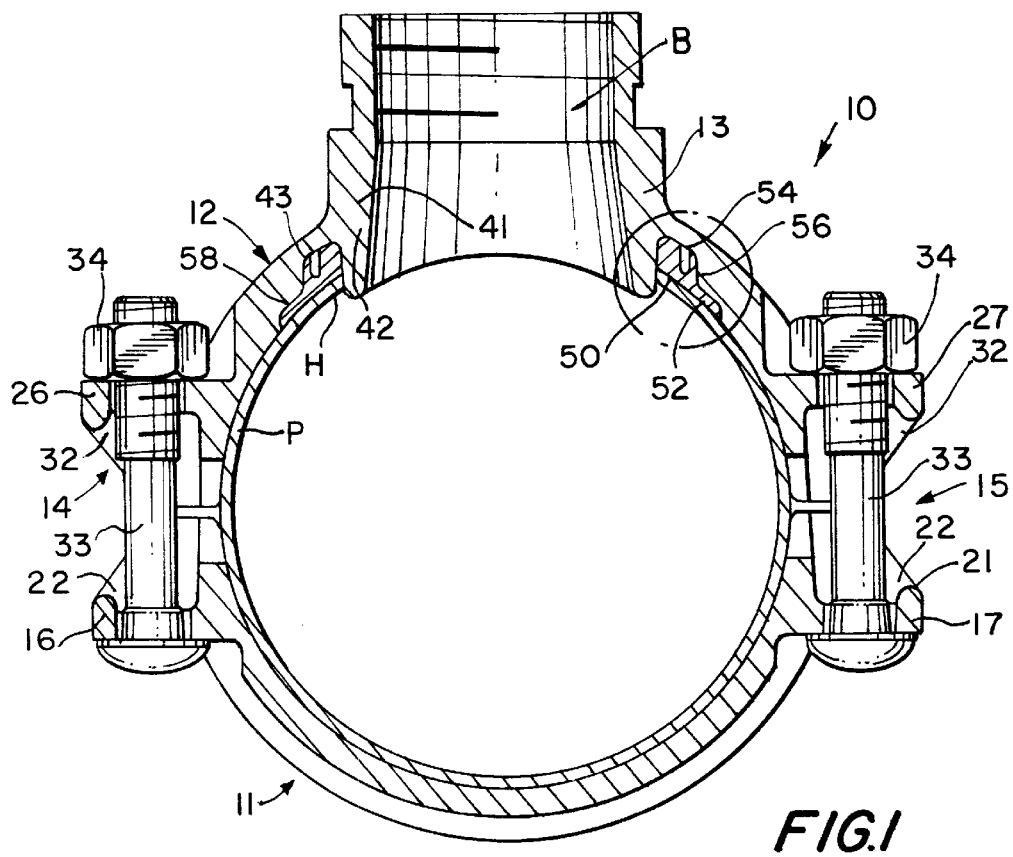
FIG. 1 is a cross sectional view along the axis of the main pipe of the assembled mechanical coupling of the instant invention.

A mechanical outlet device of the general type shown in aforementioned U.S. Pat. No. 3,999,785, but modified to include the gasket construction of the present invention, is designated by the reference numeral 10 shown in FIG. 1. It is secured around main pipe section P for connection to the branch pipe B. The outlet device 10 has a generally half-annular, continuous arcuate section 11 shown engaging the lower face of the pipe P and an arcuate section 12 with an outwardly extending outlet portion 13 engaging the upper face of the pipe P at the location of an outlet hole H through the wall of the pipe P. The sections 11 and 12 of the outlet device 10 can be metal castings, for example, castings of malleable iron, ductile iron, aluminum or brass would be satisfactory, but also other materials could be used including plastic moldings.

The simpler half-annular section 11 is seen to be of the appropriate size to engage the pipe P throughout its extent, and thus serves to reinforce and support the pipe wall. At its ends 14 and 15 the section 11 has outwardly extending bolt pads 16 and 17. The bolt pad has a channnular shape with a central web portion and legs 22. The legs 22 slant inwardly toward the pipe P at substantially a 45° angle with respect to the web portion 21.

Figure 4:
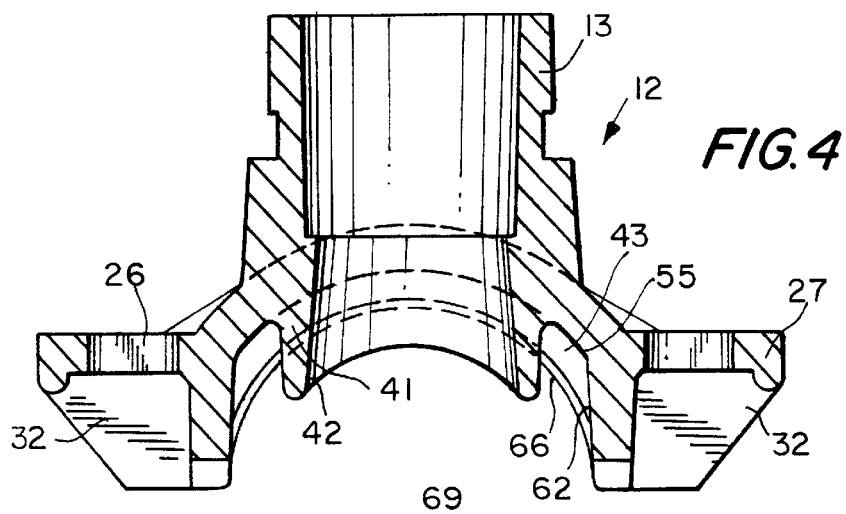
FIG. 4 is a cross sectional view of FIG. 3 as shown by the arrow 4—4 and looking in the direction of the arrows.
Figure 5:
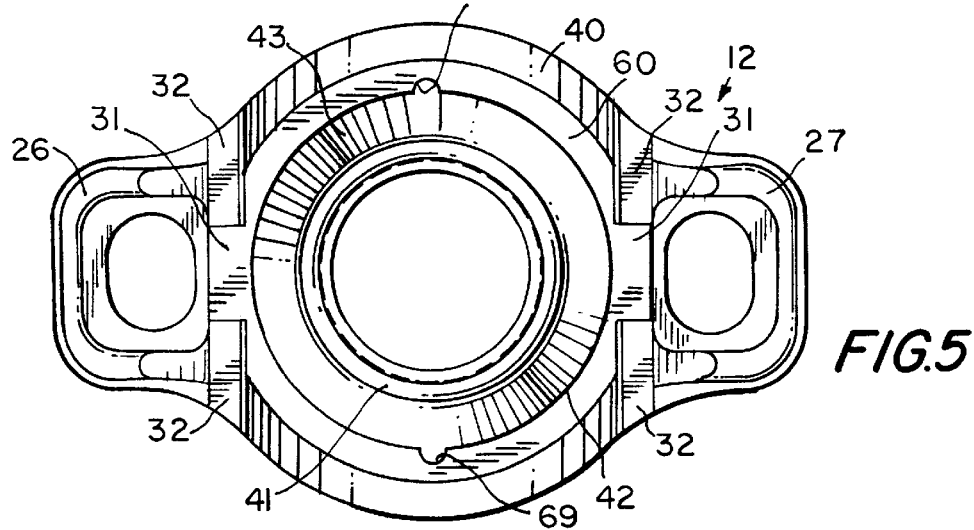
FIG. 5 is a bottom view thereof.
Figure 6:
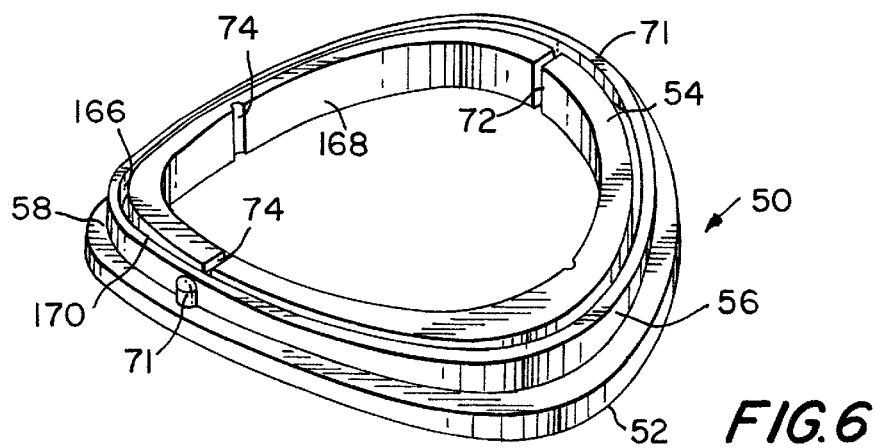
FIG. 6 is a perspective view of the improved gasket according to the present invention.
Figure 7:
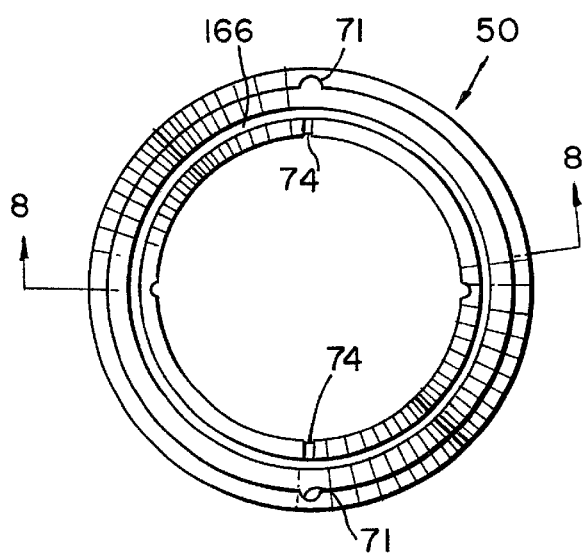
FIG. 7 is a top view of the gasket.

The other bolt pad 16 of the section 11 is similar to the bolt pad 17 in structure, as are the opposed bolt pads 26 and 27 of the section 12 of the outlet device, the bolt pads 26 and 27 having web portions 31 and slanting legs 32 (see FIGS. 4 and 5).

The sections 11 and 12 are secured together in place around a pipe P by means of bolts 33 with nuts 34. The slanted legs 22, 32 of the opposed bolt pads permit the sections 11 and 12 to "hinge" open and "swivel" with the removal of one bolt only. The other bolt undisturbed in its pre-assembled position forms the pivot around which the hinge/swivel action takes place. Subsequent placement of the other bolt 33 through the bolt pads 16, 26 and tightening of the nuts 34 secures the outlet device 10 in place. Since one bolt 33 can be left partially and loosely secured before assembly of the outlet device 10 about a pipe, one worker can easily accomplish the installation by holding the device with one hand and placing and tightening the other bolt and nuts 33, 34 with the other hand. To further facilitate installation of the mechanical outlet device 10, the bolts 33 are preferably of the track head type, fitted through oval holes 35 of the respective bolt pads 16, 26, 17 and 27. The use of track head bolts 33 make it possible to assemble and tighten the outlet device 10 in place with only one wrench.

Figure 2:
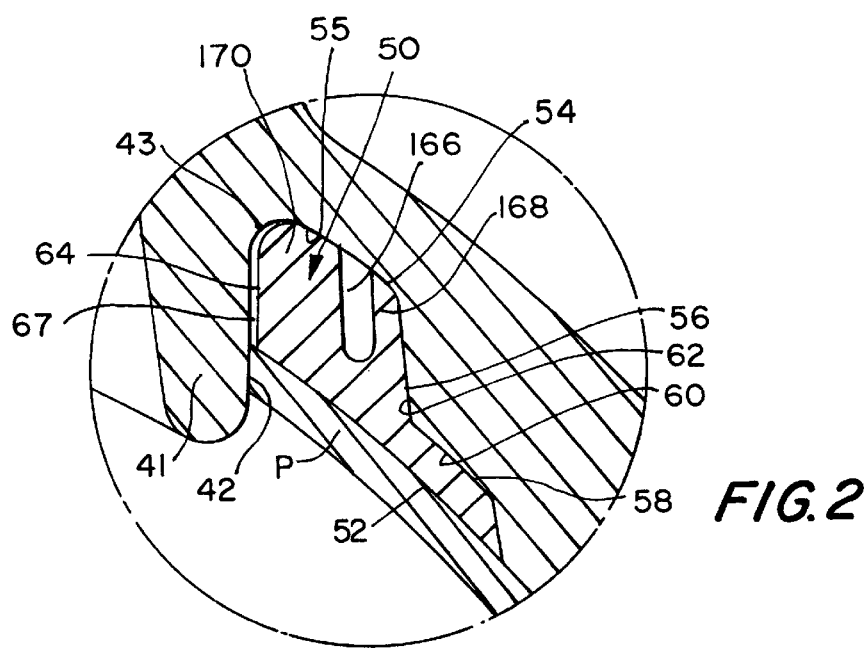
FIG. 2 illustrates the upper saddle arcuate section of the coupling to show the gasket within the gasket recess, including further details of the various sealing surfaces therebetween.
Figure 3:
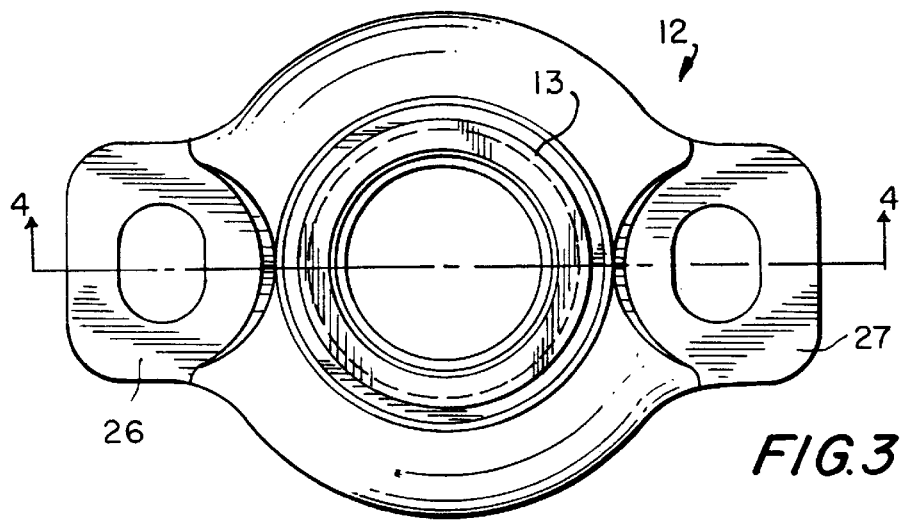
FIG. 3 is a top view of the arcuate section of the mechanical coupling which includes the branch pipe opening and gasket recess.

The section 12 of the outlet device 10 shown atop the pipe P in FIGS. 1 and 2 also embraces the wall of the pipe P throughout substantially 180° and reinforces the pipe P where reinforcement is most important—at the location of the hole H through the pipe wall. The hole H, as will be understood by those familiar with the art, is slightly larger than the diameter of the spigot 41 of the outlet device to accommodate the outlet device and to permit passage through the outlet of the desired flow to the branch pipe B. The hole H is round, i.e., the projection of a circle on the pipe wall, and need not, as in some prior art methods, be cut to exact tolerances, since the mechanical outlet of the invention accommodates reasonable roughness and even variations in diameter of the hole H which can result from the method of cutting, for example in flame cutting of holes H.

The body of section 12 is not just a semi-annular band like that of section 11, but rather has a middle portion 40 widened to the form of a saddle. The outlet portion 13 extends centrally outward from this widened portion 40 of the section 12 and a spigot 41 extends inwardly. The spigot 41 is sized to be received within the hole H with some clearance, and is accordingly also formed as the projection of a circle with a tapered lip 42 that follows the curvature of the hole H. The spigot 41, by fitting within the hole H, accurately locates the section 12 on the pipe P, and prevents dislodgement of the outlet device 10 in service.

Surrounding the spigot 41 there is a gasket-receiving recess 43 within the middle portion 40 of the section 12. The gasket receiving recess 43, follows the circumferential curvature of the outer diameter of the pipe P, and is bounded at its inner side by the lip 42 of the spigot 41.

Figure 8:
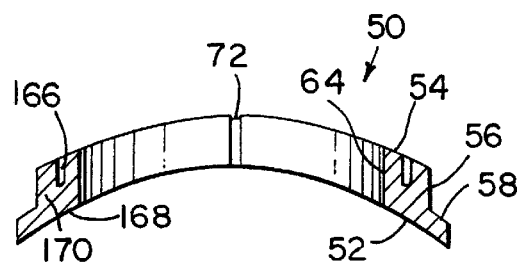
FIG. 8 is a cross sectional view of the gasket along the line 8—8, as shown in FIG. 7 and looking in the direction of the arrows.

The gasket receiving recess 43 is configured to contain gasket 50. Gasket 50 can be of rubber, or preferably some synthetic elastomer material such as chlorinated butyl or ethylene propylene dienemonomer. In accordance with the present invention, the gasket 50 includes a novel plurality of sealing surfaces, as shown in the cross sectional view of FIGS. 2 and 8. These include a first circumferential sealing surface 52 which is at the inward radial end of the gasket 50 and is adapted to overlie the outer circumferential surface of the main pipe section P about the spigot lip 42. At the opposite, outward radial extent of the gasket 50, a second generally circumferential sealing surface 54 is provided. Sealing surface 54 is configured to be in engagement with the radially outward terminus 55 of the gasket recess 43. A generally radial step 56 is provided in the gasket, circumferentially outward of the circumferential sealing surface 54, to establish a third generally circumferential sealing surface 58. Sealing surface 58 will be in engagement with a portion of the saddle wall 60 immediately outward of gasket recess 43. Thus, the gasket includes three generally parallel extending, but radially spaced, circumferential sealing surfaces 52, 54, and 58. Further, step 56 provides an additional radial sealing surface which will be in engagement with gasket recess wall 62. Also, the opposed radial wall 64 of the gasket will oppose radial wall 67 of the gasket recess.

The gasket preferably also includes diametrically opposed key projections 71 which mate with coupling recesses 69 to properly orient the gasket 50 within the gasket recess 43.

By virtue of the configuration of the gasket 50, the circumferential sealing surface 52 will generally correspond to the sum of the circumferential sealing surfaces 54, 58. This results in an increase in the sealing area provided by cylindrical seal 52 against the main pipe P, to advantageously accommodate for irregularities within the pipe surface while assuring an effective seal, without necessitating a correspondingly large increase in overall circumferential extent or depth of gasket 50. This, in turn, allows the coupling 10 to accommodate larger size branch pipes within the outlet portion 13 without requiring a substantial increase in the overall size of coupling 10. As a further advantage resulting from the present gasket construction, by minimizing the depth of gasket recess 43, the draft along the generally radial walls 62 and 66 is reduced. This eases the removal of the casting from its mold. Further, the gasket configuration facilitates the retention of the gasket 50 within the gasket recess 43 during the on site installation of the coupling 10.

According to a further feature of the preferred embodiment of the gasket, an annular pressure slot 166 is provided about sealing surface 54. Pressure slot 166 bifurcates sealing surface 54 to form a pair of pressure responsive wall surfaces 168, 170. The pressure from within pipe P is transmitted to the annular pressure slot by a transmission means which includes communicating channels 72, 74. As increased pressure is applied to the annular pressure slot 166, wall section 168 will be urged towards the spigot lip 42, while wall section 170 will be urged into enhanced sealing engagement with the gasket recess wall 62.

Thus, the configuration of gasket 50, and the plurality of circumferential seals provided thereby, against the main pipe P, gasket recess 43, and the associated concave saddle wall of coupling arcuate section 12, provide an improved seal within a minimal size coupling.

Numerous modifications, applications, and substitutions of material will suggest themselves to those familiar with the piping arts, and such alterations are considered to be within the spirit and scope of the invention. For example, arcuate section 11 of the coupling may be similar to member 12, so as to permit two branch pipes to be connected to opposed diametrical openings within the main pipe P. Accordingly, it is intended that the invention be described by the following claims.

I claim:

1. A mechanical coupling for connecting a branch pipe to a main pipe at a hole through the wall of the main pipe, comprising:

a. opposed first and second arcuate sections defining a cylindrical space therebetween for embracing the wall of the main pipe;

the first of the arcuate sections including a concave saddle wall, defining a portion of a cylindrical surface having a radius generally corresponding to the outer circumference of the main pipe, a radially extending branch pipe opening within the first arcuate section, dimensioned to overlay the main pipe opening and communicate with the saddle wall, and a spigot wall surrounding the branch pipe opening, and terminating at the saddle wall;

b. a radially extending gasket recess, surrounding the spigot wall, the gasket recess having a radially inward opening terminus at the saddle wall, and a radially outward wall terminus in the direction of the branch pipe;

c. a gasket for sealing engagement within the gasket recess and the main pipe, the gasket including:

i. a first generally circumferential sealing surface at one radial end terminus of the gasket, positioned along the radially inward open terminus of the gasket recess for engagement with the outer circumference of the main pipe proximate the spigot wall, and providing a continuation of the saddle wall, ii. a second generally circumferential sealing surface of the opposed radial end terminus of the gasket, in engagement with the radially outward wall terminus of the gasket recess, and iii. a third generally circumferential sealing surface, radially intermediate the first and second generally circumferential sealing surfaces, in engagement with the saddle wall, whereby the gasket provides radially spaced first, second and third generally circumferential sealing surfaces; and iv. a generally radial step between the second and third surfaces to provide a fourth generally radial sealing surface, the fourth generally radial sealing surface being in engagement with a generally radial sealing surface of the gasket groove opposite the spigot wall;

such that the second sealing surface includes an annular pressure slot to bifurcate the second sealing surface and provide first and second radial wall surfaces, a first of the radial wall surfaces opposing the spigot wall, and a second of the radial wall surfaces forming the opposed radial wall of the fourth sealing surface;

d. pressure transmission means for transmitting the pressure from within the main pipe to the annular pressure slot to urge the first and second radial wall surfaces in sealing engagement with opposed wall surfaces of the spigot wall and gasket groove; and e. fastening means for detachably fastening the first and second arcuate sections to one another in embracing relationship around the wall of the main pipe.

2. The mechanical coupling in accordance with claim 1, wherein the first sealing surface has a circumferential area for engagement with the outer circumference of the main pipe which generally corresponds to the sum of the circumferential areas of the second and third sealing surfaces.

3. A mechanical coupling in accordance with claim 1, wherein the pressure transmission means includes at least one channel extending between the first and second sealing surfaces.

4. The mechanical coupling in accordance with claim 1, wherein the gasket includes a key projection and the gasket recess includes a cooperating key recess for orienting the gasket within the gasket recess.

5. The mechanical coupling according to claim 1, wherein the fastening means are bolts with correspondingly cooperating nuts.

6. The mechanical coupling according to claim 5, wherein each of the first and second arcuate sections has a pair of laterally opposed ends with at least one hole therethrough such that corresponding holes in each of the ends of the first and second arcuate sections align with one another when the first and second arcuate sections are in embracing relationship around the wall of the main pipe such that a bolt is insertable through each pair of cooperating holes and is detachably secured with a corresponding nut.

7. The mechanical coupling according to claim 6, wherein each laterally opposed end of the first and second arcuate sections is a bolt pad, having a channnular shape with at least one hole therethrough, with a central web portion and legs which slant inwardly toward the main pipe at an angle of from about 40° to about 50° with respect to the web portion, such that corresponding channels in the bolt pads of the first and second arcuate sections at each end align with one another when the first and second arcuate sections are in embracing relationship to one another around the main pipe, when at least one respective pair of bolts, inserted through the channels, and nuts, at least one pair of each end detachably secure the first and second arcuate sections to the main pipe.

8. The mechanical coupling according to claim 5, wherein the bolts are track head bolts.

9. The mechanical coupling according to claim 1, wherein each of the first and second arcuate sections has a pair of laterally opposed ends, such that a first end of the first arcuate member is pivotally hinged to a first end of the second arcuate member, and further such that each of the second ends of the first and second arcuate sections has at least one hole therethrough such that corresponding holes in the second ends at each of the first and second arcuate sections align with one another when first and second arcuate sections are in embracing relationship around the wall of the main pipe, such that a bolt is insertable through each pair of cooperating holes and is detachably secured with a corresponding nut.

10. The mechanical coupling according to claim 9, wherein each at the laterally opposed ends of the first and second arcuate section is a bolt end, having a channnular shape with at least one hole therethrough with a central web portion and legs which slant inwardly toward the main pipe at an angle of from about 40° to about 50° with respect to the web portion, such that corresponding channels in the bolt pads of the first and second arcuate sections at each end align with one another when the first and second arcuate sections are in embracing relationship to one another around the main pipe, when at least one respective pair of bolts, inserted through the channels, and nuts, at least one pair at each end detachably secure the first and second arcuate sections to the main pipe.

11. A mechanical coupling for providing a multi-surface coupling seal between a main pipe and a branch pipe, the mechanical coupling including a gasket that is a unitary member having a generally saddle shape, and including at least first, second and third generally parallel extending, and radially spaced, circumferential sealing surfaces, said first and second sealing surfaces defining opposed radially inward and outward termini of the gasket;

said third sealing surface being radially intermediate to said first and second sealing surfaces, said first, second and third sealing surfaces being molded into and forming a part of the unitary gasket;

said second sealing surface including an annular pressure slot to bifurcate said second sealing surface to form first and second pressure responsive radial wall surfaces; and transmission means communicating said first sealing surface and said annular pressure slot.

12. The mechanical coupling in accordance with claim 11, wherein the transmission means includes at least one channel extending between circumferentially innermost locations of the first and second sealing surfaces.

13. The mechanical coupling in accordance with claim 11, wherein the annular slot effects movement of the first and second wall surfaces towards opposed coupling surfaces in response to a predetermined input pressure to the annular slot.

14. The mechanical coupling in accordance with claim 11, wherein the first sealing surface has a circumferential area of sealing surface generally corresponding to the sum of the circumferential areas of the second and third sealing surfaces.

15. The mechanical coupling in accordance with claim 11, further comprising a generally radial step between the second and third sealing surfaces to provide a fourth generally radial sealing surface.

16. The mechanical coupling in accordance with claim 15, wherein the first sealing surface has a circumferential area of sealing surface generally corresponding to the sum of the circumferential areas of the second and third sealing surfaces.

\* \* \* \* \*